US012774801B1

(12) United States Patent
Newcomb et al.

(10) Patent No.: US 12,774,801 B1
(45) Date of Patent: Oct. 27, 2026

(54) TASK LIGHTING USING LIQUID CRYSTALS WITH AN ADJUSTABLE AND AUTOMATED BEAM PATTERN

(71) Applicant: GM Global Technology Operations LLC, Detroit, MI (US)

(72) Inventors: Bradley Allen Newcomb, Troy, MI (US); Jonglee Park, Novi, MI (US)

(73) Assignee: GM Global Technology Operation LLC, Detroit, MI (US)

( * ) Notice: Subject to any disclaimer, the term of this patent is extended or adjusted under 35 U.S.C. 154(b) by 0 days.

(21) Appl. No.: 19/260,464

(22) Filed: Jul. 5, 2025

(51) Int. Cl.
*F21V 14/00* (2018.01)
*B60Q 3/74* (2017.01)

(52) U.S. Cl.
CPC .............. *F21V 14/003* (2013.01); *B60Q 3/74* (2017.02)

(58) Field of Classification Search
CPC ............... F21V 14/003; F21V 23/0442; F21V 23/0471; F21V 23/0478; B60Q 3/20; B60Q 3/30; B60Q 3/74; B60Q 3/745; B60Q 3/82
See application file for complete search history.

(56) References Cited

U.S. PATENT DOCUMENTS 4,873,469 A * 10/1989 Young .................... H05B 47/13 340/567
2008/0205075 A1* 8/2008 Hikmet .................... B60Q 3/80 362/488
2009/0296408 A1* 12/2009 Hendriks ................ F21V 14/00 362/311.01
2015/0167933 A1* 6/2015 Crompvoets ........... F21V 13/00 362/278
2015/0252984 A1* 9/2015 Van Bommel ............ F21V 9/32 362/84
2016/0252235 A1* 9/2016 Benner ............... F21V 23/0435 362/257
2018/0086257 A1* 3/2018 Lecorre ................ G02B 26/004
2019/0018436 A1* 1/2019 Wu ....................... H05B 47/125
2020/0245423 A1* 7/2020 Honjo ................. F21V 23/0471

* cited by examiner

*Primary Examiner* — Jong-Suk (James) Lee
*Assistant Examiner* — James M Endo
(74) *Attorney, Agent, or Firm* — Honigman LLP; Matthew H. Szalach

(57) ABSTRACT

A computer-implemented method includes determining, based on sensor data captured by a passenger monitoring system, a region of an interior compartment of the vehicle to be illuminated. The method further includes determining an illumination beam pattern for light emitted by the adjustable task-lighting module that at least partially illuminates the region of the interior compartment of the vehicle. The method further includes determining, based on the illumination beam pattern, a control voltage, wherein an adjustable voltage source coupled to a configurable liquid-crystal element is configured to provide the control voltage to the configurable liquid-crystal element for configuring an illumination beam pattern of an adjustable task-lighting module. The method further includes controlling the adjustable voltage source to provide the control voltage to the configurable liquid-crystal element for configuring the adjustable task-lighting module to emit light having the illumination beam pattern.

19 Claims, 6 Drawing Sheets

FIG. 1
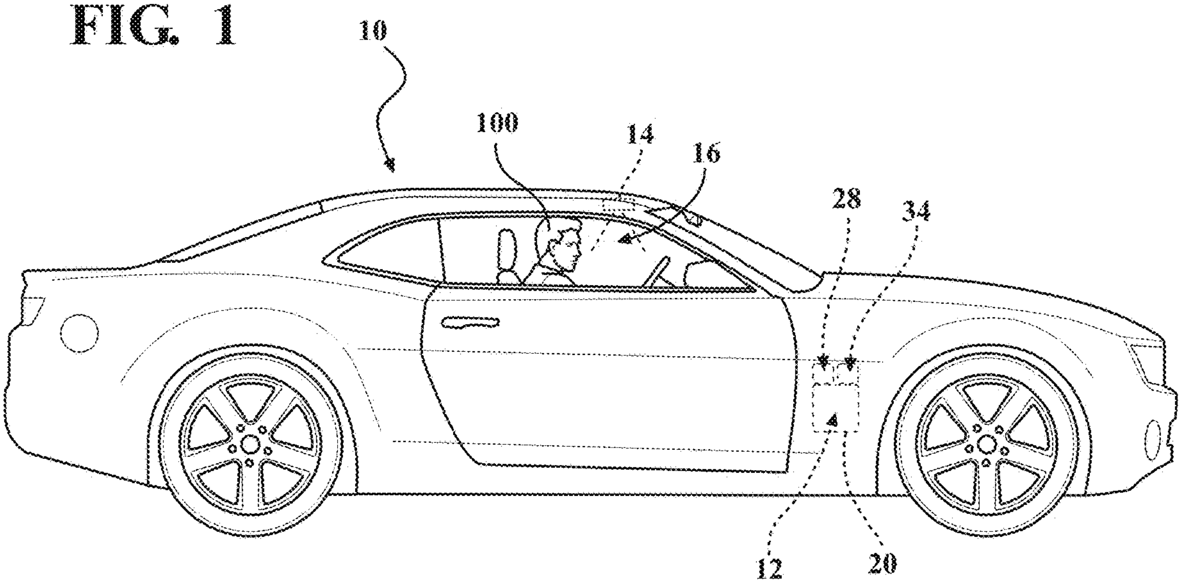
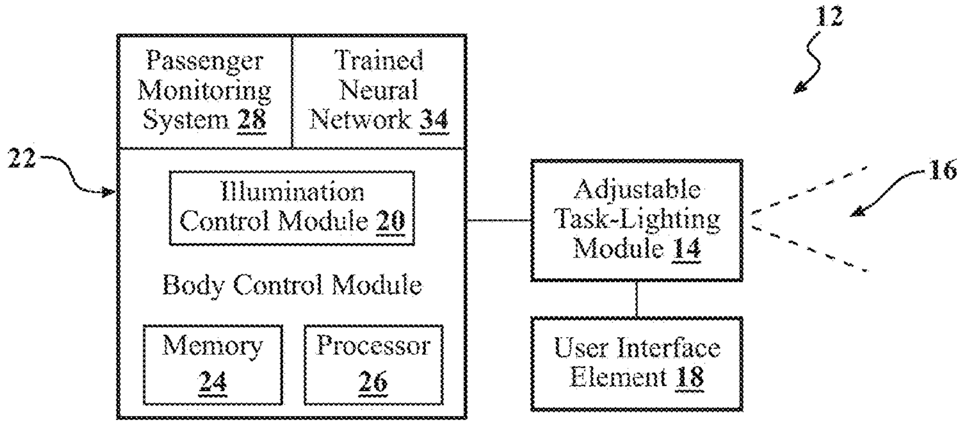
FIG. 2

TASK LIGHTING USING LIQUID CRYSTALS WITH AN ADJUSTABLE AND AUTOMATED BEAM PATTERN

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Task lighting in vehicles is designed to provide illumination for specific activities, enhancing both functionality and safety. This type of lighting is strategically placed to assist drivers and passengers in performing tasks that require clear visibility, such as reading maps, operating controls, or finding items within the vehicle. Typically, task lighting includes features like overhead reading lights, glove compartment lights, and footwell lights. Overall, task lighting plays an important role in improving the convenience and comfort of vehicle occupants, ensuring that essential tasks can be performed safely and efficiently, even in low-light conditions.

The present disclosure relates generally to adjustable task-lighting systems using liquid crystals including adjustable task-lighting systems that automatically adjust illumination beam patterns.

SUMMARY

One aspect of the disclosure provides a vehicle including an adjustable task-lighting system. The adjustable task-lighting system includes an adjustable task-lighting module. The adjustable task-lighting module includes a light source, a configurable liquid-crystal element, and an adjustable voltage source coupled to the configurable liquid-crystal element. The adjustable task-lighting module is configured to provide a control voltage to the configurable liquid-crystal element for configuring an illumination beam pattern of the adjustable task-lighting module. The adjustable task-lighting system further includes data processing hardware and memory hardware in communication with the data processing hardware and storing instructions that, when executed by the data processing hardware, cause the data processing hardware to perform operations. The operations include determining, based on sensor data captured by a passenger monitoring system, a region of an interior compartment of the vehicle to be illuminated. The operations further include determining an illumination beam pattern for light emitted by the adjustable task-lighting module that at least partially illuminates the region of the interior compartment of the vehicle. The operations further include determining, based on the illumination beam pattern, the control voltage. The operations further include controlling the adjustable voltage source to provide the control voltage to the configurable liquid-crystal element for configuring the adjustable task-lighting module to emit light having the illumination beam pattern.

Implementations of the disclosure may include one or more of the following optional features. In some examples, the configurable liquid-crystal element includes a polymer-dispersed liquid-crystal material.

In some configurations, the configurable liquid-crystal element includes a plurality of configurable liquid-crystal segments, wherein each configurable liquid-crystal segment is individually configurable to pass light in a corresponding particular direction. In some further configurations, the operations further include selecting the corresponding particular directions to form the selected illumination beam pattern.

In some implementations, determining the control voltage includes determining the control voltage to cause the configurable liquid-crystal element to pass light in a particular direction toward the region of the interior compartment of the vehicle.

In some examples, the configurable liquid-crystal element comprises a curved configurable liquid-crystal element.

In some configurations, the illumination beam pattern includes at least one selected from the group consisting of (i) a narrow spot lighting pattern, (ii) a task-lighting pattern, and (iii) a flood lighting pattern.

In some implementations, the vehicle further includes a user interface element associated with the adjustable task-lighting module. The operations further include receiving, using the user interface element, a user input representing a selected illumination beam pattern for light emitted by the adjustable task-lighting module. In some further implementations, the user interface element comprises at least one of a physical slider or a touch sensor. In some other further implementations, determining the region of the interior compartment of the vehicle to be illuminated is responsive to selection of an automatic lighting control included with the user interface element.

In some examples, the passenger monitoring system includes at least one selected from the group consisting of (i) one or more cameras and (ii) one or more radar sensors.

In some configurations, the operations further include adjusting the illumination beam pattern based on change in the region of the interior compartment of the vehicle to be illuminated.

In some implementations, the region of the interior compartment of the vehicle corresponds to one or more objects to be illuminated, and the one or more objects is verified by a trained neural network.

Another aspect of the disclosure provides a computer-implemented method executed by data processing hardware that causes the data processing hardware to perform operations. The operations include determining, based on sensor data captured by a passenger monitoring system, a region of an interior compartment of the vehicle to be illuminated. The operations further include determining an illumination beam pattern for light emitted by the adjustable task-lighting module that at least partially illuminates the region of the interior compartment of the vehicle. The operations further include determining, based on the illumination beam pattern, a control voltage, wherein an adjustable voltage source coupled to a configurable liquid-crystal element is configured to provide the control voltage to the configurable liquid-crystal element for configuring an illumination beam pattern of an adjustable task-lighting module. The operations further include controlling the adjustable voltage source to provide the control voltage to the configurable liquid-crystal element for configuring the adjustable task-lighting module to emit light having the illumination beam pattern.

Implementations of the disclosure may include one or more of the following optional features. In some examples, the configurable liquid-crystal element includes a plurality of configurable liquid-crystal segments, wherein each configurable liquid-crystal segment is individually configurable to pass light in a corresponding particular direction. In some further examples, the operations further include selecting the corresponding particular directions to form the selected illumination beam pattern.

In some configurations, determining the control voltage includes determining the control voltage to cause the configurable liquid-crystal element to pass light in a particular direction toward the region of the interior compartment of the vehicle.

In some implementations, the operations further include adjusting the illumination beam pattern based on change in the region of the interior compartment of the vehicle to be illuminated.

Yet another aspect of the disclosure provides a system. The system includes data processing hardware and memory hardware in communication with the data processing hardware and storing instructions that, when executed by the data processing hardware, cause the data processing hardware to perform operations. The operations include determining, based on sensor data captured by a passenger monitoring system, a region of an interior compartment of the vehicle to be illuminated. The operations further include determining an illumination beam pattern for light emitted by the adjustable task-lighting module that at least partially illuminates the region of the interior compartment of the vehicle. The operations further include determining, based on the illumination beam pattern, a control voltage, wherein an adjustable voltage source coupled to a configurable liquid-crystal element is configured to provide the control voltage to the configurable liquid-crystal element for configuring an illumination beam pattern of an adjustable task-lighting module. The operations further include controlling the adjustable voltage source to provide the control voltage to the configurable liquid-crystal element for configuring the adjustable task-lighting module to emit light having the illumination beam pattern.

Implementations of the disclosure may include one or more of the following optional features. In some examples, the configurable liquid-crystal element includes a plurality of configurable liquid-crystal segments, wherein each configurable liquid-crystal segment is individually configurable to pass light in a corresponding particular direction. In some further examples, the operations further include selecting the corresponding particular directions to form the selected illumination beam pattern.

In some configurations, determining the control voltage includes determining the control voltage to cause the configurable liquid-crystal element to pass light in a particular direction toward the region of the interior compartment of the vehicle.

In some implementations, the operations further include adjusting the illumination beam pattern based on change in the region of the interior compartment of the vehicle to be illuminated.

BRIEF DESCRIPTION OF THE DRAWINGS

The drawings described herein are for illustrative purposes only of selected configurations and are not intended to limit the scope of the present disclosure.

FIG. 1 is a view of an example vehicle including an adjustable task-lighting system in accordance with the principles of the present disclosure;

FIG. 2 is a schematic view of the adjustable task-lighting system of FIG. 1;

Corresponding reference numerals indicate corresponding parts throughout the drawings.

DETAILED DESCRIPTION

Figure 3A:
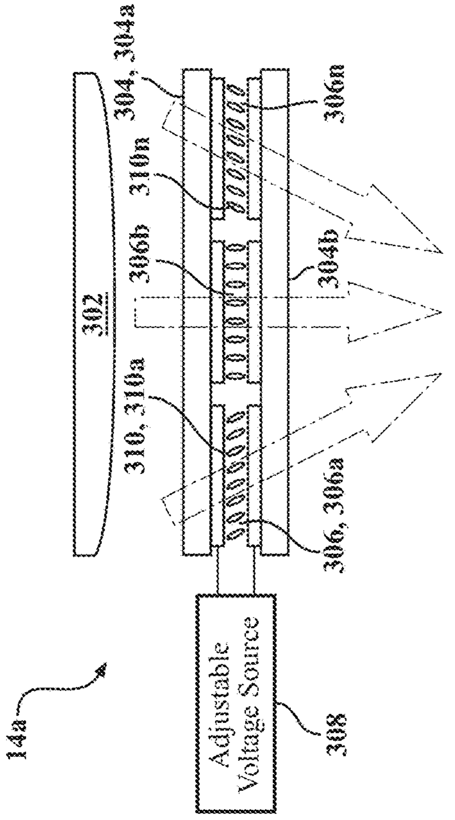
FIGS. 3A, 3B, 3C, and 3D are side views of example adjustable task-lighting modules.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks;

and CD ROM and DVD-ROM disks. The processor and the memory can be supplemented by, or incorporated in, special purpose logic circuitry or quantum computing.

To provide for interaction with a user, one or more aspects of the disclosure can be implemented on a computer having a display device, e.g., a CRT (cathode ray tube), LCD (liquid-crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

Task lighting in vehicles is designed to provide illumination for specific activities, enhancing both functionality and safety. This type of lighting is strategically placed to assist drivers and passengers in performing tasks that require clear visibility, such as reading maps, operating controls, or finding items within the vehicle. Typically, task lighting includes features like overhead reading lights, glove compartment lights, and footwell lights. Overall, task lighting plays an important role in improving the convenience and comfort of vehicle occupants, ensuring that essential tasks can be performed safely and efficiently, even in low-light conditions. However, conventional task-lighting systems only provide a single pre-configured illumination beam pattern that is either on or off, which may make it difficult to meet customer needs or desires for, for example, lighting that can vary between directional lighting, spot lighting, task lighting, and/or flood lighting. Therefore, there is a need for adjustable task-lighting systems. In disclosed examples, adjustable task-lighting systems include one or more liquid-crystal segments, which may be controlled or configured to provide multiple different illumination beam patterns or shapes. In some implementations, the liquid-crystal segments are segments or pieces of a polymer-dispersed liquid-crystal material. In some other implementations, the liquid-crystal segments are automatically controlled and may continuously adjust the illumination beam patterns, such as to direct light toward and/or adjust the direction of light to follow one or more objects or subjects intended to be illuminated. For example, the illumination beam pattern may be configured and/or adjusted based on signals received from a passenger monitoring system or cabin monitoring system of the vehicle.

While configurations are shown and described herein in connection with a vehicle (e.g., an automobile, a truck, an airplane, a train, a motorcycle, etc.), it should be understood that disclosed configurations may, additionally or alternatively, be used for providing adjustable task-lighting systems for any other type of device (e.g., a video conference system, a computer, a bicycle, industrial equipment, etc.). Here, a vehicle or device may be operated by a person or may operate independently.

With particular reference to FIGS. 1, 2, 3A, 3B, 3C, and 3D, a vehicle 10 (e.g., an automobile, a truck, an airplane, a train, a motorcycle, etc.) is shown in conjunction with an adjustable task-lighting system 12 for providing illumination having a configurable illumination beam pattern 16 (also referred to as an illumination beam shape, direction, etc.). The adjustable task-lighting system 12 includes one or more adjustable task-lighting modules 14, only one of which is shown for clarity of illustration. The adjustable task-lighting modules 14 may be located anywhere in the vehicle 10. The adjustable task-lighting module 14 has an associated user interface element 18 that an occupant 100 of the vehicle 10 may operate to provide user input representing a selected illumination beam pattern 16 for light emitted by the adjustable task-lighting module 14. The user interface element 18 may be, for example, a physical slider, a button, a switch, or a capacitive touch element.

The adjustable task-lighting system 12 includes an illumination control module 20 that may be stored and executed by, for example, a body control module (BCM) 22 or any other control module of the vehicle 10. The illumination control module 20 is configured to control the adjustable task-lighting module 14 to emit light having an illumination beam pattern 16 selected by the occupant 100 via the user interface element 18. Specifically, the BCM 22 stores machine- or computer-readable instructions for executing the illumination control module 20 on, for example, memory hardware 24. The instructions may be executed by data processing hardware 26 (e.g., a processor) of the BCM 22 to execute the illumination control module 20. Here, the illumination control module 20 performs the operations of FIG. 4, or other operations described elsewhere in the present disclosure.

FIGS. 3A, 3B, 3C, and 3D are side views of example adjustable task-lighting modules 14, 14*a-n*. In some implementations, an adjustable task-lighting module 14 is encased, or otherwise embedded, in a material (not shown for clarity of illustration), such as a polymer. As shown, an adjustable task-lighting module 14 includes a light source 302, which may be a collimated light source or a non-collimated light source, for emitting light. The light source 302 may include one or more light emitting elements, such as light emitting diodes (LEDs). In some implementations, the light source 302 includes a micro-LED panel.

The adjustable task-lighting modules 14 also include one or more substrates 304, 304*a-n* to which one or more liquid-crystal elements 306, 306*a-n* is affixed, adhered, or otherwise mounted. In some examples, the substrates 304 are made of a structural composite, such as a polymer or printed circuit board (PCB). In some configurations, the substrates 304 include a transparent material such as glass, polyethylene terephthalate (PET), polycarbonate (PC) film, and the like, thus allowing light to transmit from the light source 302 and through the substrates 304. In some implementations, the liquid-crystal elements 306 include, or are formed of, a polymer-dispersed liquid-crystal (PDLC) material. The examples of FIGS. 3A and 3B include three liquid-crystal elements 306, while the examples of FIGS. 3C and 3D include only one liquid-crystal element 306. However, an adjustable task-lighting module 14 may have any number of liquid-crystal elements 306.

Figure 3B:
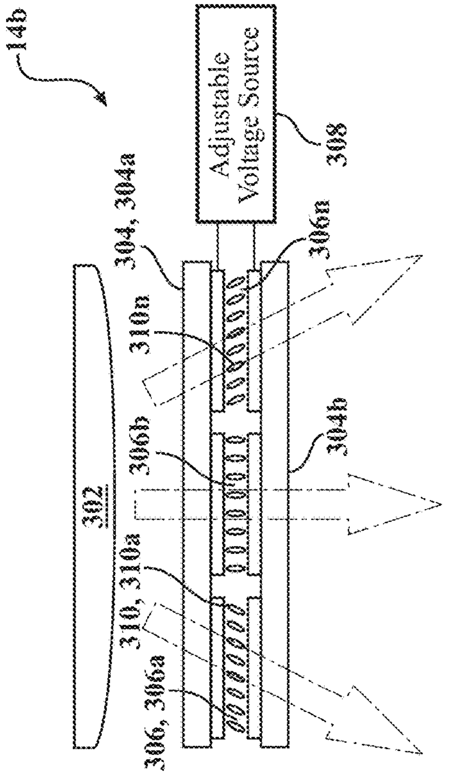
Figure 3C:
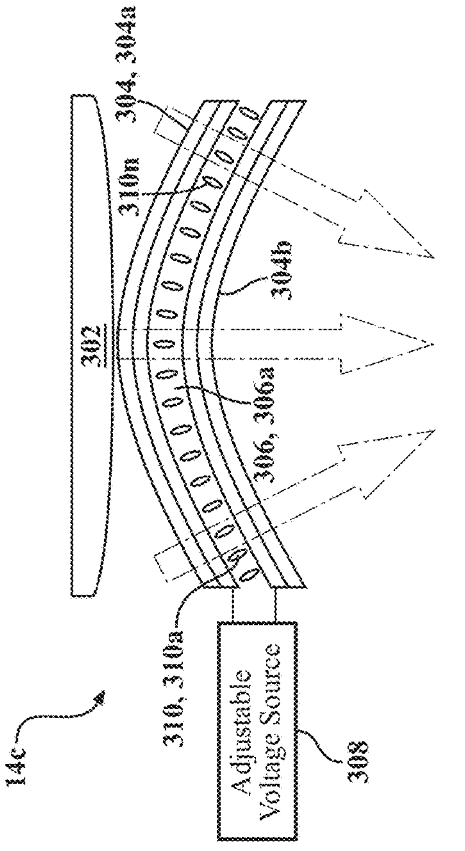
Figure 3D:
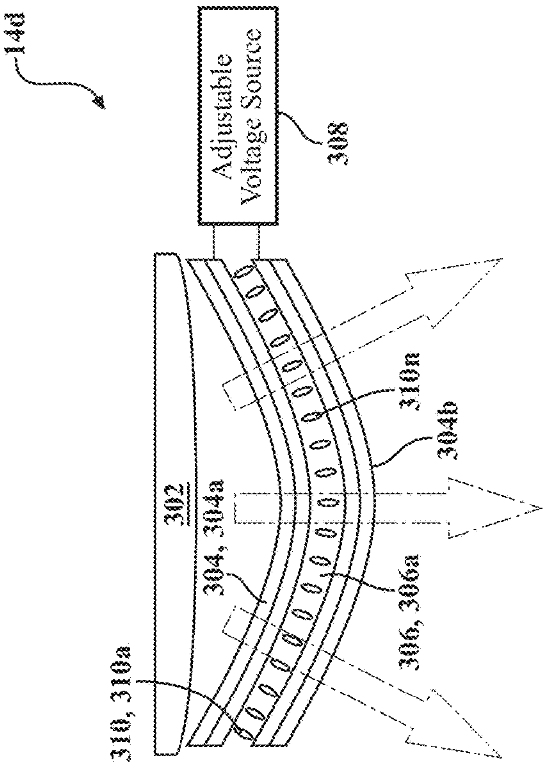

By controlling an adjustable voltage source 308 to apply a control voltage to, or across, a liquid-crystal element 306, the orientations of liquid-crystals 310, 310*a-n* of the liquid-crystal element 306 can be controlled to have any desired angle or tilt such that light may be emitted from the liquid-crystal element 306 at any desired angle, or to be random such that the liquid-crystal element 306 randomly disperses light or is opaque. In some examples, the angle, tile, or orientation of the liquid-crystals 310 varies with the control voltage applied to the liquid-crystal element 306 by the adjustable voltage source 308. As shown, the liquid-crystal elements 306 of an adjustable task-lighting module 14 can be controlled to have the same or different angles such that the adjustable task-lighting module 14 can provide multiple different illumination beam patterns based on a user input received using the user interface element 18. The examples of FIGS. 3A and 3C provide a narrow task illumination beam pattern, while the examples of FIGS. 3B and 3D provide a flood illumination pattern. However, the liquid-crystal element(s) 306 of an adjustable task-lighting module 14 may be configured to emit light according to any arrangement or combination of directions or angles. In some implementations, a single adjustable voltage source 308 can be controlled to provide multiple different control voltages for multiple liquid-crystal elements 306. In other implementations, an adjustable task-lighting module 14 may have a different adjustable voltage source 308 for each liquid-crystal element 306.

While the liquid-crystal elements 306 appear linearly in the illustrated examples, a liquid-crystal element 306 may have any one-, two-, or three-dimensional shape. Example shapes include, but are not limited to, a linear shape, a rectangular shape, a square shape, a circular shape, and an annular shape. Moreover, liquid-crystal elements 306 may be oriented at different angles or orientations with respect to other liquid-crystal elements 306.

In some examples, the illumination control module 20 receives, using the user interface element 18, a user input representing a selected illumination beam pattern for light emitted by the adjustable task-lighting module 14. The illumination control module 20 determines, based on the user input, a corresponding control voltage for each liquid-crystal element 306 of the adjustable task-lighting module 14. Thereafter, the illumination control module 20 controls adjustable voltage source(s) 308 of the adjustable task-lighting module 14 to provide the determined control voltage(s) to the configurable liquid-crystal element(s) 306 for configuring the adjustable task-lighting module 14 to emit light having the selected illumination beam pattern.

Figure 4:
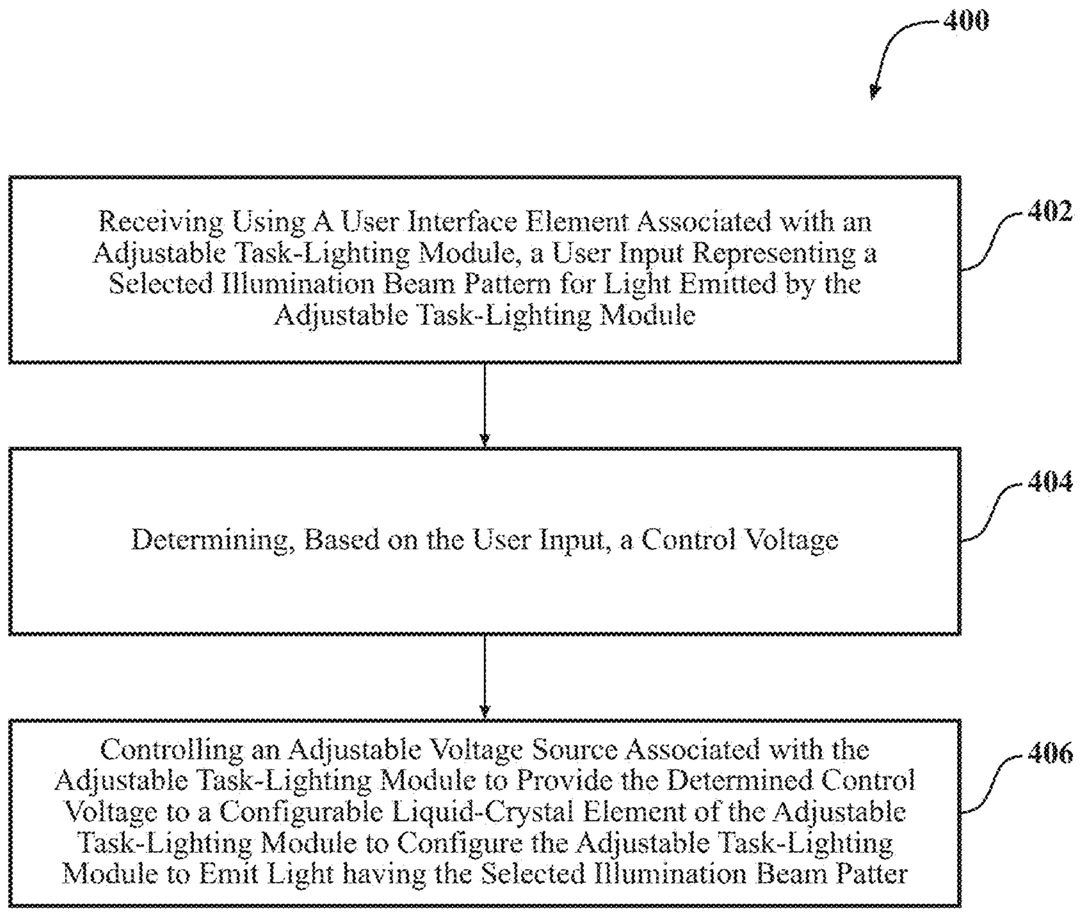
FIG. 4 is a flowchart of an example arrangement of operations for controlling the adjustable task-lighting system of FIG. 1.
Figure 5:
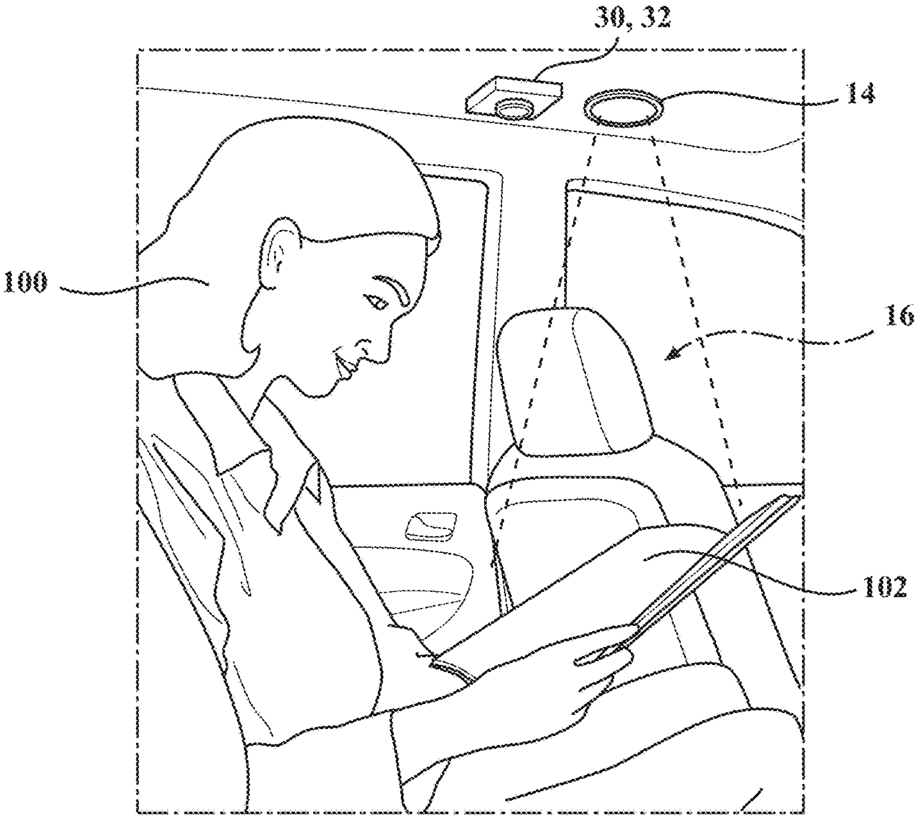
FIG. 5 is a view of an interior compartment of the example vehicle of FIG. 1 including a passenger monitoring system associated with the adjustable task-lighting system.
Figure 6:
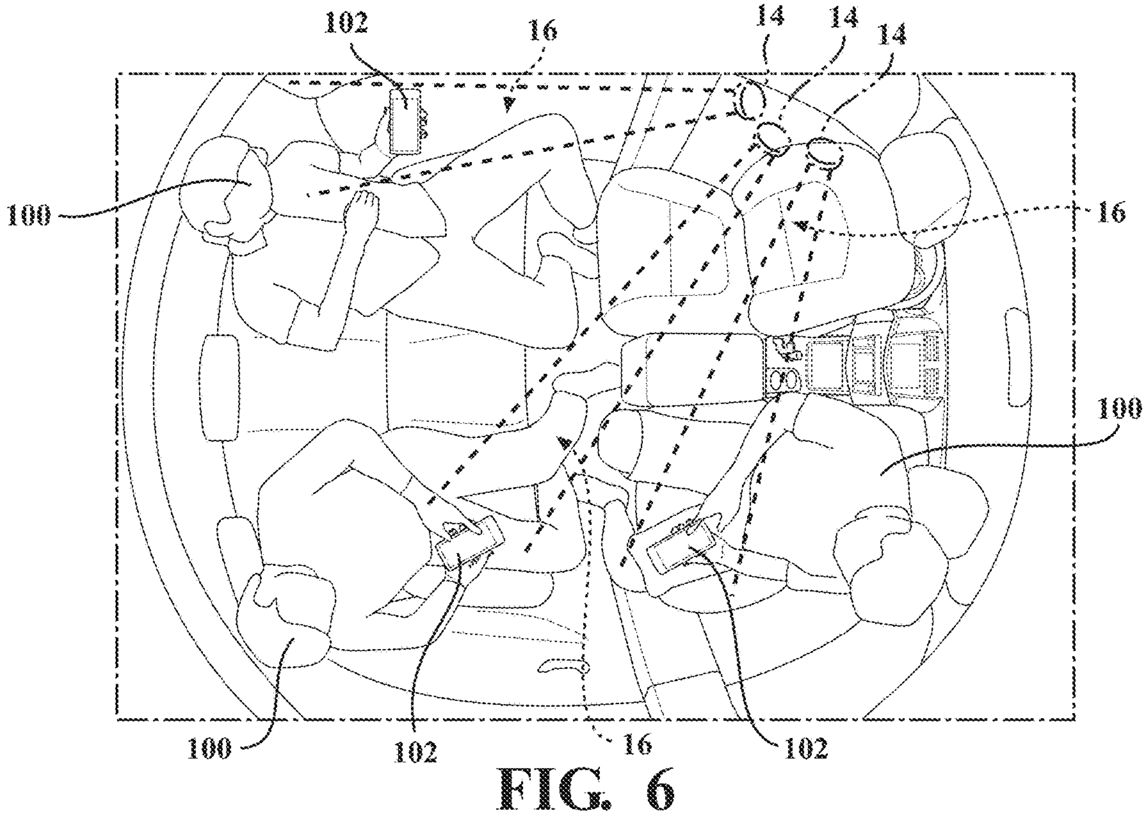
FIG. 6 is another view of the interior compartment of the example vehicle of FIG. 1.

FIG. 4 is a flowchart of an exemplary arrangement of operations for a computer-implemented method 400 for controlling the adjustable task-lighting system 12 of FIG. 1. The operations may be performed by data processing hardware (e.g., the data processing hardware 26 of FIG. 1) based on executing instructions stored on memory hardware (e.g., the memory hardware 24 of FIG. 1). Many other ways of implementing the method 400 may be employed. For example, the order of execution of the operations may be changed, and/or one or more of the operations and/or interactions may be changed, eliminated, sub-divided, or combined. Additionally, the operations of FIG. 4 may be carried out sequentially and/or in parallel by, for example, separate processing threads, processors, devices, discrete logic, circuits, etc.

At operation 402, the method 400 includes receiving, using the user interface element 18 associated with an adjustable task-lighting module 14, a user input representing a selected illumination beam pattern 16 for light emitted by the adjustable task-lighting module 14. At operation 404, the method 400 includes determining, based on the user input, a control voltage. At operation 406, the method 400 includes controlling an adjustable voltage source 308 associated with the adjustable task-lighting module 14 to provide the control voltage to a configurable liquid-crystal element 306 of the adjustable task-lighting module 14 for configuring the adjustable task-lighting module 14 to emit light having the selected illumination beam pattern.

With reference to FIGS. 1 and 5-7, the adjustable task-lighting system 12 may include or be associated with a passenger monitoring system 28 of the vehicle 10. The passenger monitoring system 28 enables the adjustable task-lighting system 12 to perform automatic adjustments to the illumination beam pattern 16. In other words, the illumination beam pattern 16 may be automatically and/or continuously adjusted when the adjustable task-lighting system 12 operates based on signals from the passenger monitoring system 28. In this regard, the illumination beam pattern 16 may automatically adjust between a narrow task illumination beam and a flood illumination pattern, may automatically adjust to any arrangement or combination of directions or angles, and may automatically adjust between different intensities of illumination. As discussed further below, signals from the passenger monitoring system 28 may identify one or more regions of the interior cabin or compartment of the vehicle 10 to be illuminated, such as a seating position, a floor or foot well region, and the like. Automatic adjustments to the illumination beam pattern 16 may at least partially correspond to positioning and location of the occupant 100 and/or an object or subject 102 intended to be illuminated.

The passenger monitoring system 28 includes one or more sensors, such as one or more cameras 30, one or more radar sensors 32, or both one or more cameras 30 and one or more radar sensors 32. The one or more cameras 30 and the one or more radar sensors 32 are disposed in the vehicle 10 so as to have a field of view or field of sensing that includes the occupants 100 and objects 102 in the vehicle 10, such as at a location proximate to the occupant or occupants 100 and the object or objects 102 intended to be illuminated. For example, the cameras 30 and/or radar sensors 32 may be disposed at an upper central portion of the interior cabin of the vehicle 10, such as at or near an overhead console module, a grab handle, an interior rearview mirror assembly, and the like. Based on sensor data from the one or more cameras 30 and the one or more radar sensors 32, the passenger monitoring system 28 is configured to detect the object or objects 102 intended to be illuminated. Further, passenger monitoring system 28 is configured to track the object or objects 102 if and when they are moved throughout the vehicle 10 such as, for example, when an occupant 100 moves the object 102 from a left side of the vehicle 10 toward a right side of the vehicle 10. In this regard, the passenger monitoring system 28 recognizes the real-time location of the object or objects 102 within the vehicle 10 that is intended to be illuminated.

Detection and tracking of the object 102 via sensor data from the one or more cameras 30 and the one or more radar sensors 32 corresponds to adjustments of the beam pattern 16 when the beam pattern 16 is being used to illuminate the object 102. In other words, the beam pattern 16 continuously adjusts based on the real-time location of the object 102 to provide uninterrupted and sufficient illumination on the object 102. For example, when the occupant 100 is reading a large document such as a large road map, the passenger monitoring system 28 may detect the large road map as the object 102 intended to be illuminated. The passenger monitoring system 28 may command the adjustable task-lighting system 12 to direct the beam pattern 16 from the light source 302 of the adjustable task-lighting module 14 in a flood illumination pattern that is directed toward the large road map. The flood illumination pattern is provided by the adjustable task-lighting module 14 due to the large size of the large road map, thus providing sufficient lighting coverage for the object 102. If the occupant 100 moves the large road map toward a different location within the vehicle 10, the cameras 30 and the radar sensors 32 may detect the movement of the object 102 and the passenger monitoring system 28 may command the adjustable task-lighting system 12 to adjust the direction of the beam pattern 16 so the beam pattern 16 is sufficiently maintained on the large road map and illumination of the large road map is uninterrupted. If the occupant 100 folds the large road map into a much smaller size, the cameras 30 and the radar sensors 32 may detect the reduced size of the object 102 and the passenger monitoring system 28 may command the adjustable task-lighting system 12 to adjust the configuration of the beam pattern 16 from a flood illumination pattern to a spot lighting pattern so the beam pattern 16 is retained and focused on the folded road map.

A trained neural network 34 may be associated with the passenger monitoring system 28 and/or adjustable task-lighting system 12. The trained neural network 34 is a deep learning model that is configured to learn and understand data associated with the passenger monitoring system 28 and/or adjustable task-lighting system 12. In other words, the trained neural network 34 enables the passenger monitoring system 28 and/or adjustable task-lighting system 12 to continuously improve and adapt its operation based on behavior of the occupant 100. For example, the trained neural network 34 may recognize that the occupant 100 commonly uses the adjustable task-lighting system 12 to illuminate books based on object detection by the passenger monitoring system 28. As a result, as the trained neural network 34 recognizes multiple instances of this behavior, the passenger monitoring system 28 may quickly and efficiently command the beam pattern 16 to illuminate the book with very little delay and with exceptional accuracy. Further, the trained neural network 34 may provide verification that the object 102 detected by the camera 30 and the radar sensor 32 is indeed the object 102 intended to be illuminated.

Use of the passenger monitoring system 28 by the adjustable task-lighting system 12 may be enabled and disabled by the occupant 100 via the user interface element 18. For example, the user interface element 18 may include a button, a switch, a capacitive touch element, or something of the like that is configured to enable and disable use of the passenger monitoring system 28. The adjustable task-lighting system 12 operates without detection of the object 102 when the passenger monitoring system 28 is disabled. In this regard, the occupant 100 is responsible for manually adjusting the beam pattern 16 via the user interface element 18 to illuminate the object or subject 102 intended to be illuminated. The adjustable task-lighting system 12 operates with detection of the object 102 and automatic adjustment of the beam pattern 16 when the passenger monitoring system 28 is enabled. In this regard, the occupant 100 is free to move the object 102 intended to be illuminated within the vehicle 10 while the beam pattern 16 automatically adjusts to retain sufficient illumination on the object 102.

Figure 7:
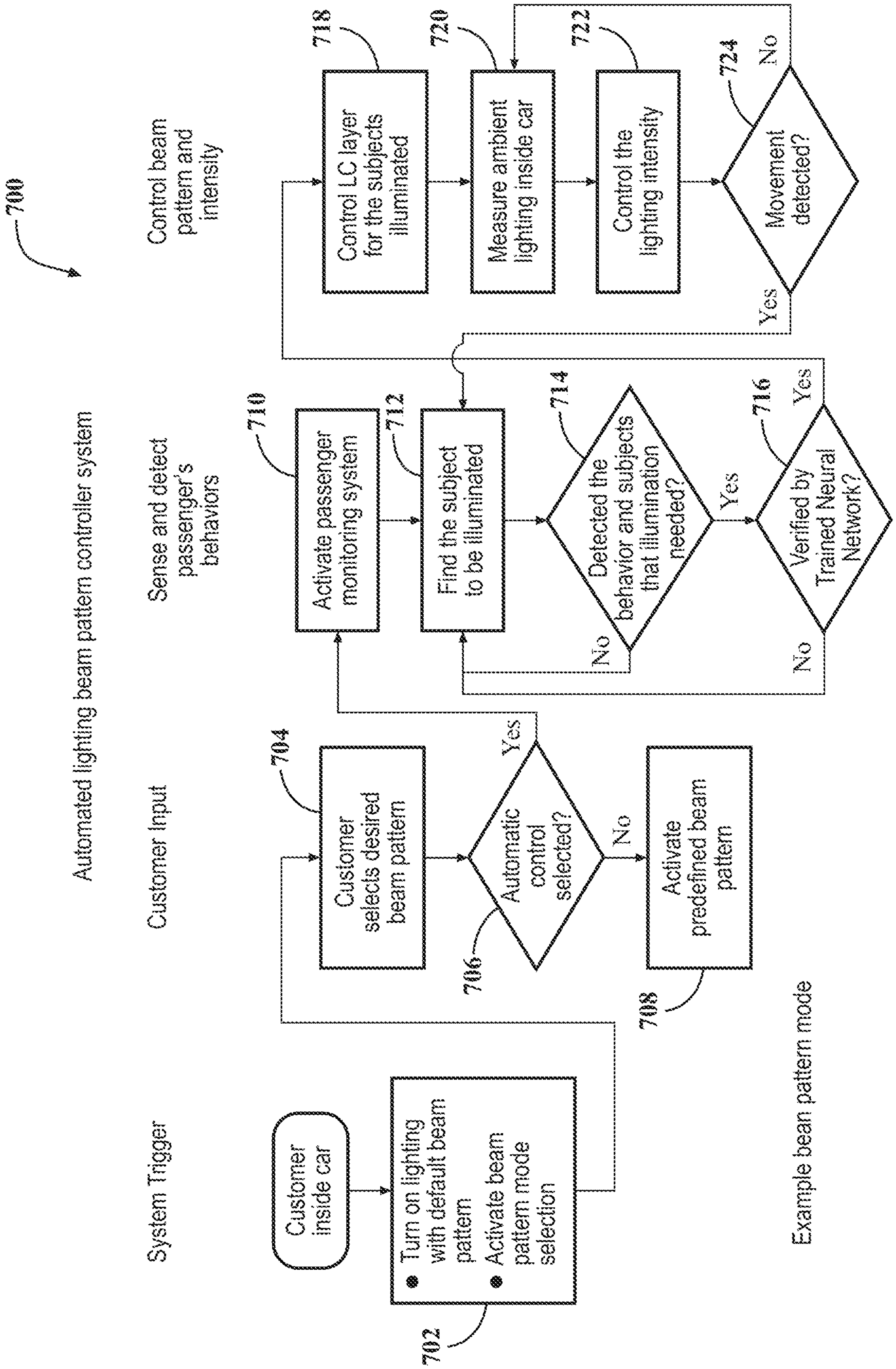
FIG. 7 is a flowchart of an example arrangement of operations for controlling the adjustable task-lighting system of FIG. 1 based on signals from the passenger monitoring system of FIG. 5.

FIG. 7 is a flowchart of an exemplary arrangement of operations for a computer-implemented method 700 for controlling the adjustable task-lighting system 12 of FIG. 1 including the passenger monitoring system 28. The operations may be performed by data processing hardware (e.g., the data processing hardware 26 of FIG. 1) based on executing instructions stored on memory hardware (e.g., the memory hardware 24 of FIG. 1). Many other ways of implementing the method 700 may be employed. For example, the order of execution of the operations may be changed, and/or one or more of the operations and/or interactions may be changed, eliminated, sub-divided, or combined. Additionally, the operations of FIG. 7 may be carried out sequentially and/or in parallel by, for example, separate processing threads, processors, devices, discrete logic, circuits, etc.

At operation 702, the method 700 includes initiating the adjustable task-lighting system 12 with a default beam pattern. Concurrently, the user interface element 18 may display a beam pattern mode selection. At operation 704, the occupant 100 may select the beam pattern 16 desired, including an option to enable the passenger monitoring system 28. At operation 706, the adjustable task-lighting system 12 checks whether the passenger monitoring system 28 was enabled. At operation 708, the beam pattern 16 that is selected is activated if the occupant 100 did not enable the passenger monitoring system 28. However, at operation 710, the passenger monitoring system 28 is enabled upon the occupant 100 making the corresponding selection at the user interface element 18. At operation 712, based on sensor data captured by the camera 30 and/or the radar sensor 32, the passenger monitoring system 28 detects the object 102 to be illuminated. At operation 714, the passenger monitoring system 28 recognizes the object 102 to be illuminated based on sensor data received from the camera 30 and the radar sensor 32. At operation 716, the trained neural network 34 provides verification to the passenger monitoring system 28 that the object 102 detected by the camera 30 and the radar sensor 32 is the object 102 intended by the occupant 100 to be illuminated. Operation 712 is reinitiated and the method proceeds from operation 712 as described above if the passenger monitoring system 28 fails to recognize the object 102 to be illuminated or the trained neural network 34 fails to provide verification to the passenger monitoring system 28 that the object 102 is the correct object that is desired to be illuminated. At operation 718, the liquid-crystal elements 306 are adjusted to direct the beam pattern 16 toward the object 102. At operation 720, ambient lighting within the vehicle 10 is measured. The measurement of the ambient lighting within the vehicle 10 may be performed by a sensor such as, for example, the one or more cameras 30 and the one or more radar sensors 32 included with the passenger monitoring system 28. At operation 722, the lighting intensity of the light source 302 is adjusted to accommodate sufficient and comfortable illumination considerate of the current ambient lighting. At operation 724, the passenger monitoring system 28 checks if movement of the object 102 is detected. Operation 720 is reinitiated, and the method proceeds from operation 720 as described above when the passenger monitoring system 28 fails to detect movement of the object 102. Operation 712 is reinitiated, and the method proceeds from operation 712 as described above when the passenger monitoring system 28 successfully detects movement of the object 102.

Figure 8:
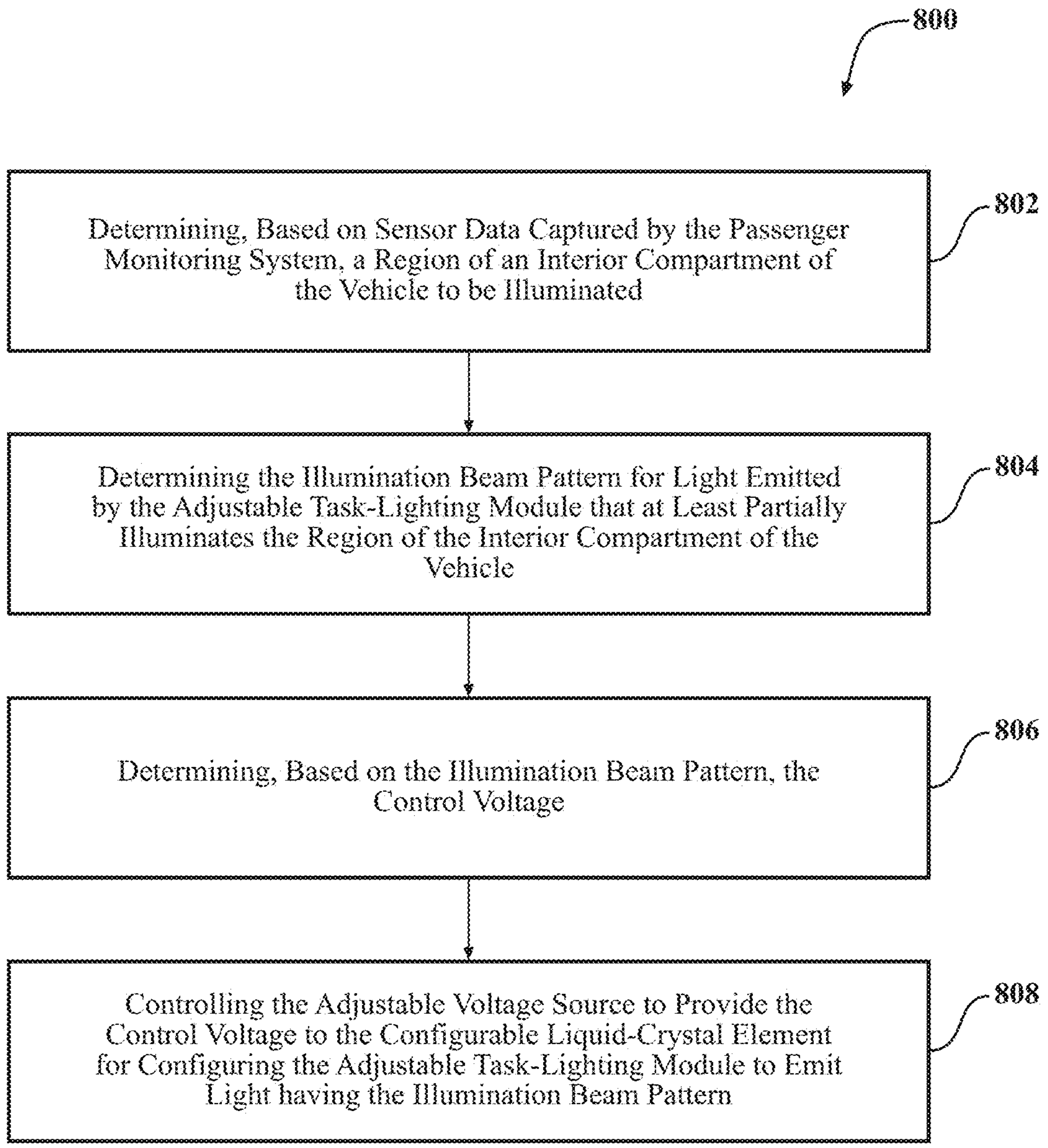
FIG. 8 is a flowchart of another example arrangement of operations for controlling the adjustable task-lighting system of FIG. 1 based on signals from the passenger monitoring system of FIG. 5.

FIG. 8 is a flowchart of an exemplary arrangement of operations for a computer-implemented method 800 for controlling the adjustable task-lighting system 12 of FIG. 1 including the passenger monitoring system 28. The operations may be performed by data processing hardware (e.g., the data processing hardware 26 of FIG. 1) based on executing instructions stored on memory hardware (e.g., the memory hardware 24 of FIG. 1). Many other ways of implementing the method 800 may be employed. For example, the order of execution of the operations may be changed, and/or one or more of the operations and/or interactions may be changed, eliminated, sub-divided, or combined. Additionally, the operations of FIG. 8 may be carried out sequentially and/or in parallel by, for example, separate processing threads, processors, devices, discrete logic, circuits, etc.

At operation 802, the method 800 includes determining, based on sensor data captured by the passenger monitoring system 28, a region of an interior compartment of the vehicle 10 to be illuminated. At operation 804, the method 800 includes determining the illumination beam pattern 16 for light emitted by the adjustable task-lighting module 14 that at least partially illuminates the region of the interior compartment of the vehicle 10. At operation 806, the method 800 includes determining, based on the illumination beam pattern 16, the control voltage. At operation 808, the method 800 includes controlling the adjustable voltage source 308 to provide the control voltage to the configurable liquid-crystal element 306 for configuring the adjustable task-lighting module 14 to emit light having the illumination beam pattern 16.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle comprising an adjustable task-lighting system, the adjustable task-lighting system comprising:
- an adjustable task-lighting module comprising:
  - a light source;
  - a configurable liquid-crystal element; and
  - an adjustable voltage source coupled to the configurable liquid-crystal element and configured to provide a control voltage to the configurable liquid-crystal element for configuring an illumination beam pattern of the adjustable task-lighting module;
- data processing hardware; and
- memory hardware in communication with the data processing hardware and storing instructions that, when executed by the data processing hardware, cause the data processing hardware to perform operations comprising:
  - determining, based on first sensor data captured by a passenger monitoring system, an object at a first location in an interior compartment of the vehicle to be illuminated;
  - determining an illumination beam pattern for light emitted by the adjustable task-lighting module that at least partially illuminates the object at the first location;
  - determining, based on the illumination beam pattern, the control voltage;
  - controlling the adjustable voltage source to provide the control voltage to the configurable liquid-crystal element for configuring the adjustable task-lighting module to emit light having the illumination beam pattern to illuminate the object at the first location;
  - tracking, based on second sensor data captured by the passenger monitoring system, a movement of the object to a different second location in the interior compartment of the vehicle; and
  - based on tracking the movement of the object to the second location, controlling the adjustable voltage source to adjust the control voltage to the configurable liquid-crystal element for adjusting the adjustable task-lighting module to emit light having the illumination beam pattern to illuminate the object at the second location.

2. The vehicle of claim 1, wherein the configurable liquid-crystal element comprises a polymer-dispersed liquid-crystal material.

3. The vehicle of claim 1, wherein:
- the configurable liquid-crystal element comprises a plurality of configurable liquid-crystal segments, wherein each configurable liquid-crystal segment is individually configurable to pass light in a corresponding particular direction; and
- the operations further comprise selecting the corresponding particular directions to form the illumination beam pattern that is selected.

4. The vehicle of claim 1, wherein determining the control voltage comprises determining the control voltage to cause the configurable liquid-crystal element to pass light in a particular direction toward the first location in the interior compartment of the vehicle.

5. The vehicle of claim 1, wherein the configurable liquid-crystal element comprises a curved configurable liquid-crystal element, the curved configurable liquid-crystal element including a curved first surface and a curved second surface opposite the curved first surface and parallel to the curved first surface.

6. The vehicle of claim 1, wherein the illumination beam pattern comprises at least one selected from the group consisting of (i) a narrow spot lighting pattern, (ii) a task-lighting pattern, and (iii) a flood lighting pattern.

7. The vehicle of claim 1, further comprising a user interface element associated with the adjustable task-lighting module, the operations further including receiving, using the user interface element, a user input representing a selected illumination beam pattern for light emitted by the adjustable task-lighting module.

8. The vehicle of claim 7, wherein the user interface element comprises at least one of a physical slider or a touch sensor.

9. The vehicle of claim 7, wherein determining the object in the interior compartment of the vehicle to be illuminated is responsive to selection of an automatic lighting control included with the user interface element.

10. The vehicle of claim 1, wherein the passenger monitoring system includes at least one selected from the group consisting of (i) one or more cameras and (ii) one or more radar sensors.

11. The vehicle of claim 1, wherein the object is verified by a trained neural network.

12. A computer-implemented method executed by data processing hardware that causes the data processing hardware to perform operations comprising:

determining, based on first sensor data captured by a passenger monitoring system, an object at a first location in an interior compartment of a vehicle to be illuminated;

determining an illumination beam pattern for light emitted by an adjustable task-lighting module that at least partially illuminates the object at the first location;

determining, based on the illumination beam pattern, a control voltage, wherein an adjustable voltage source coupled to a configurable liquid-crystal element is configured to provide the control voltage to the configurable liquid-crystal element for configuring an illumination beam pattern of the adjustable task-lighting module;

controlling the adjustable voltage source to provide the control voltage to the configurable liquid-crystal element for configuring the adjustable task-lighting module to emit light having the illumination beam pattern to illuminate the object at the first location;

tracking, based on second sensor data captured by the passenger monitoring system, a movement of the object to a different second location in the interior compartment of the vehicle; and based on tracking the movement of the object to the second location, controlling the adjustable voltage source to adjust the control voltage to the configurable liquid-crystal element for adjusting the adjustable task-lighting module to emit light having the illumination beam pattern to illuminate the object at the second location.

13. The computer-implemented method of claim 12, wherein:

the configurable liquid-crystal element comprises a plurality of configurable liquid-crystal segments, wherein each configurable liquid-crystal segment is individually configurable to pass light in a corresponding particular direction; and the operations further comprise selecting the corresponding particular directions to form the illumination beam pattern that is selected.

14. The computer-implemented method of claim 12, wherein determining the control voltage comprises determining the control voltage to cause the configurable liquid-crystal element to pass light in a particular direction toward the object at the first location.

15. The computer-implemented method of claim 12, wherein the configurable liquid-crystal element comprises a curved configurable liquid-crystal element, the curved configurable liquid-crystal element including a curved first surface and a curved second surface opposite the curved first surface and parallel to the curved first surface.

16. A system comprising:

data processing hardware; and memory hardware in communication with the data processing hardware and storing instructions that, when executed by the data processing hardware, cause the data processing hardware to perform operations comprising:

determining, based on first sensor data captured by a passenger monitoring system, an object at a first location in an interior compartment of a vehicle to be illuminated;

determining an illumination beam pattern for light emitted by an adjustable task-lighting module that at least partially illuminates the object at the first location;

determining, based on the illumination beam pattern, a control voltage, wherein an adjustable voltage source coupled to a configurable liquid-crystal element is configured to provide the control voltage to the configurable liquid-crystal element for configuring an illumination beam pattern of the adjustable task-lighting module;

controlling the adjustable voltage source to provide the control voltage to the configurable liquid-crystal element for configuring the adjustable task-lighting module to emit light having the illumination beam pattern to illuminate the object at the first location;

tracking, based on second sensor data captured by the passenger monitoring system, a movement of the object to a different second location in the interior compartment of the vehicle; and based on tracking the movement of the object to the second location, controlling the adjustable voltage source to adjust the control voltage to the configurable liquid-crystal element for adjusting the adjustable task-lighting module to emit light having the illumination beam pattern to illuminate the object at the second location.

17. The system of claim 16, wherein:

the configurable liquid-crystal element comprises a plurality of configurable liquid-crystal segments, wherein each configurable liquid-crystal segment is individually configurable to pass light in a corresponding particular direction; and the operations further comprise selecting the corresponding particular directions to form the illumination beam pattern that is selected.

18. The system of claim 16, wherein determining the control voltage comprises determining the control voltage to cause the configurable liquid-crystal element to pass light in a particular direction toward the object at the first location.

19. The system of claim 16, wherein the configurable liquid-crystal element comprises a curved configurable liquid-crystal element, the curved configurable liquid-crystal element including a curved first surface and a curved second surface opposite the curved first surface and parallel to the curved first surface.

* * * * *